United States Patent [19]

Naito et al.

[11] 4,050,880
[45] Sept. 27, 1977

[54] METHOD AND APPARATUS OF BAKING CARBONACEOUS MOLDING

[75] Inventors: Kiyoshi Naito, Urawa; Akio Shukuya, Kawagoe, both of Japan

[73] Assignee: Shinagawa Refractories Co. Ltd., Tokyo, Japan

[21] Appl. No.: 667,851

[22] Filed: Mar. 18, 1976

[30] Foreign Application Priority Data

Apr. 16, 1975 Japan .................................. 50-45180

[51] Int. Cl.² ........................... F27D 5/00; F27B 9/00
[52] U.S. Cl. .......................................... 432/5; 432/72; 432/192
[58] Field of Search ................... 432/5, 72, 137, 144, 432/145, 149, 150, 192

[56] References Cited

U.S. PATENT DOCUMENTS

| | | | |
|---|---|---|---|
| 2,678,205 | 5/1954 | Buhler et al. | 432/72 X |
| 2,983,022 | 5/1961 | Dressler et al. | 432/144 |
| 3,048,382 | 8/1962 | Mansfield | 432/192 |

*Primary Examiner*—John J. Camby
*Attorney, Agent, or Firm*—Brady, O'Boyle & Gates

[57] ABSTRACT

A method and apparatus for the continuous baking of preheating, burning and cooling of carbonaceous moldings, which comprises burning fuels at the side and bottom portions of saggers which are charged with breeze and carbonaceous moldings to be baked; movably arranging a MOBAC [Mobile Baking Chamber] beneath a fixed ceiling having a combustion device and a gas recirculation system, in which MOBAC a baking chamber and a gas flue of refractory material are provided which pass combustion gas, heating gas or cooling gas; sealing the space between the fixed ceiling and the MOBAC and the upper contact surface of each MOBAC from atmospheric air; and connecting a number of said MOBAC in a row and moving them beneath the fixed ceiling.

15 Claims, 4 Drawing Figures

METHOD AND APPARATUS OF BAKING CARBONACEOUS MOLDING

This invention relates to a method and apparatus for the continuous baking of carbonaceous molding using coke breeze as a filler.

The primary baking of carbonaceous molding is carried out in such manner that a molding to be baked is charged into a sagger, the molding is charged with coke breeze as if it is supported and surrounded with the breeze, and the molding is indirectly heated from the outside of the sagger.

Conventionally, there is Stationary Batch Type Furnace or the Ring Kiln Type for such kind of primary baking of carbonaceous materials. In case of Ring Kiln Type a number of stationary baking chambers are adjacently provided with a ring condition and baking operations are cyclicly effected by transferring the burning to an adjacent baking chamber at predetermined time intervals. Each system is of refractory stationary sagger construction.

In said Ring Kiln Type it is very difficult to carry out effective energy saving, pollution-free, manpower saving and improvement of working environment. In order to make these requirements, continuous baking method has been tried employing a tunnel kiln. Said continuous baking metod is carried out by loading a metallic sagger instead of stationary refractory sagger onto a kiln car and by moving the material to be baked.

This method might be utilized for secondary baking which is effected by impregnating tar into the primary baking product. However, in case of primary baking, baking temperatures are high and a high precision of temperature control is required even in view of improving product yield so that even when very expensive heat-resistant metallic saggers were used losses have occurred owing to thermal deformation and high temperature erosion and other problems, thereby not achieving continuous primary baking by metallic saggers.

Further, there is also known a method wherein carbonaceous molding to be baked is baked, without being charged into a sagger, by maintaining the non-combustion supporting atmosphere in the kiln all over the zone of baking steps. In case of the tunnel kiln in the above mentioned methods extremely complicated construction is required and complicated operations are required to maintain the whole preheating, burning and cooling atmosphere gases at a predetermined temperature and in a non-combustion supporting atmosphere. That is, carbonaceous molding to be baked requires the difference of atmospheric condition and furnace pressure condition in each temperature zone through each step of preheating, burning and cooling, but all these steps must be treated in a single continued chamber such as tunnel kiln. Moreover, in order that all the steps require a non-combustion supporting atmosphere it becomes impossible to intentionally burn and treat the emitted liquid tar on a kiln car but it might be required to treat the tar liquid by separately guiding out.

Furthermore, as the most fundamental difference these methods are quite incapable of being applied in the case of thermoplastic moldings such as usual round electrode in which the moldings to be baked cause a thermal deformation in the baking process.

Only through continuation of the primary baking process can a process be devised to solve all the pending questions such as complete capturing and burning of the tar-pitch liquid and gas which are discharged from the molding in the primary baking process in view of pollution prevention and energy saving, and utilizing, as a heating source of the molding to be baked, the entire caloric value which generates when burning; and prevention of the occurrence of secondary pollution which, for example, may follow water-washing of exhaust gas, dust precipitating and the like; man-power saving by automation, mechanization or the like or charge/discharge operation of the molding to be baked and the breeze; and improvement of operational environment by dust precipitator or the like.

The present invention provides a novel method and apparatus of baking carbonaceous molding, which are capable of continuously baking the moldings to be baked, which could not be achieved even with said metallic sagger.

According to the essential feature of the invention there are provided a number of MOBAC (Mobile Baking Chamber) units wherein refractory saggers are used instead of metallic saggers, fuels are burned at the side and bottom portions of the refractory saggers, the gas flue in the sagger also serving as a heating surface is made of the same material, the external periphery of the gas flue consists of a heat-insulating material, and the external side portion and bottom portion of said heat-insulating material consists of steel material, the whole construction of MOBAC thus being retained strong; each MOBAC is provided with a moving device such as wheels or roller; and the MOBACs are connected altogether. Further, in the present invention, a fixed ceiling supported by posts is arranged over the whole length of said row of MOBACs, an upper gas passage is formed at the upper portion of each MOBAC, said upper gas passage is partitioned at each MOBAC with a movable transverse partition plate, heating gases flow into the neighboring MOBAC through the gas flue at the side and bottom portions of each sagger at each MOBAC, and between the external steel surface of said row of MOBACs and the fixed heat-retaining wall provided at the ceiling post there is provided a heat-retaining space whose upper and lower portions are sealed, so that said MOBACs are moved in series and the carbonaceous molding is continuously baked.

The main object of this invention is to provide a method and an apparatus for the continuous baking of preheating, burning and cooling of carbonaceous moldings, which comprises burning fuels at the side and bottom portions of saggers which are charged with breeze and carbonaceous moldings to be baked; movably arranging a MOBAC beneath the fixed ceiling having a combustion means and a gas recirculation means, in which MOBAC is contained a combustion chamber and a gas flue which pass combustion gas, heating gas or cooling gas consisting of refractory material; sealing the space between said fixed ceiling and said MOBAC and the upper contact surface of the MOBACs from the atmospheric air; and connecting a number of said MOBAC in a row and moving them beneath the fixed ceiling.

Another object of the invention is to provide a method and an apparatus wherein said gases which are emitted into a downward gas flue passing through the fixed ceiling from the gas recirculation means and the combustion means are all used as circulation energy of atmosphere gas in the kiln, thereby decreasing the furnace pressure difference required for the gas flow in the kiln, and the method and apparatus having functions of regulating the temperature and quantity of said atmosphere gas.

Another object of the invention is to provide a method and an apparatus which comprises partitioning at each MOBAC, by a movable partition plate, a gas flue between the lower surface of said fixed ceiling and the upper surface of said MOBAC, and passing the atmosphere gas through the entire periphery of the saggers in the MOBAC.

Another object of this invention is to provide a method and an apparatus which provides maintaining to a minimum, by regulating the temperature of the outer periphery of said MOBAC, the thermal stress which takes place in the steel shell of the MOBAC owing to the thermal expansion difference between the refractory material and the steel shell in the MOBAC.

Another object of this invention is to provide a method and an apparatus which comprises utilizing, as heating atmosphere gas in the preheating zone in which the temperature of the moldings to be baked is in the range from room temperature to 250° C, a clean gas in which gas containing tar mists and fumes in higher temperature zone has been burned and raised in temperature.

Still another object of the present invention is to provide a method and an apparatus wherein in the temperature zone 250° –600° C in which volatile ingredients come out from the moldings to be baked, burning and temperature rising of all the combustible gases in the atmosphere gases in the kiln are effected by a gas recirculation means having a burning and temperature rising device; and the $O_2$ concentration in the atmosphere gas in the kiln is less than 14 percent.

Further another object of the invention is to provide a method and an apparaus which comprises carrying out burning in the burning zone in which the temperature of the moldings to be baked is more than 600° C, with a plurality of burners for combustion according to an intermittent firing system in which combustion and put out are repeated at short periods of time.

The features and advantages of the invention will be better understood from the following description, taken in connection with the accompanying drawings, in which.

Figure 1:
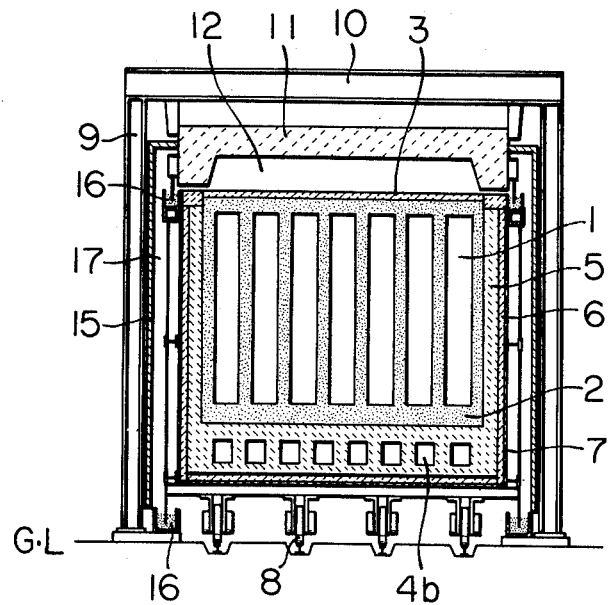
FIG. 1 is a sectional view taken at a right angle to the kiln axis shown with the line I—I in FIG. 3, and shows a heat-retaining space.
Figure 2:
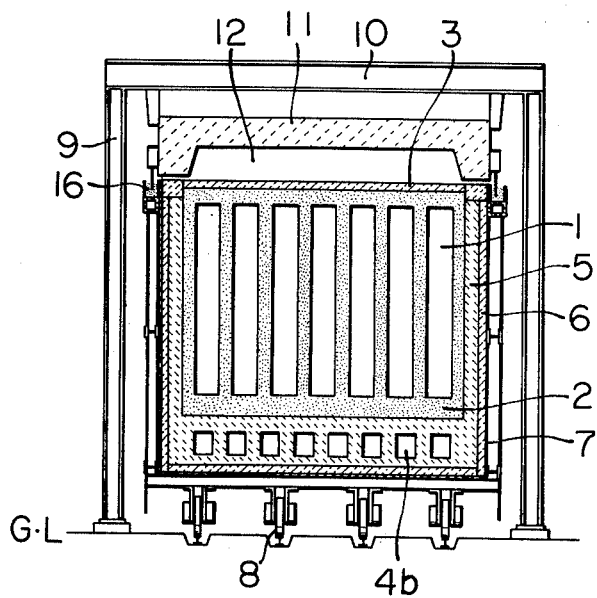
FIG. 2 is a sectional view taken at a right angle to the kiln axis shown with the line II—II in FIG. 4, and is an enlarged sectional view showing in detail the portion having no heat-retaining space.
Figure 3:
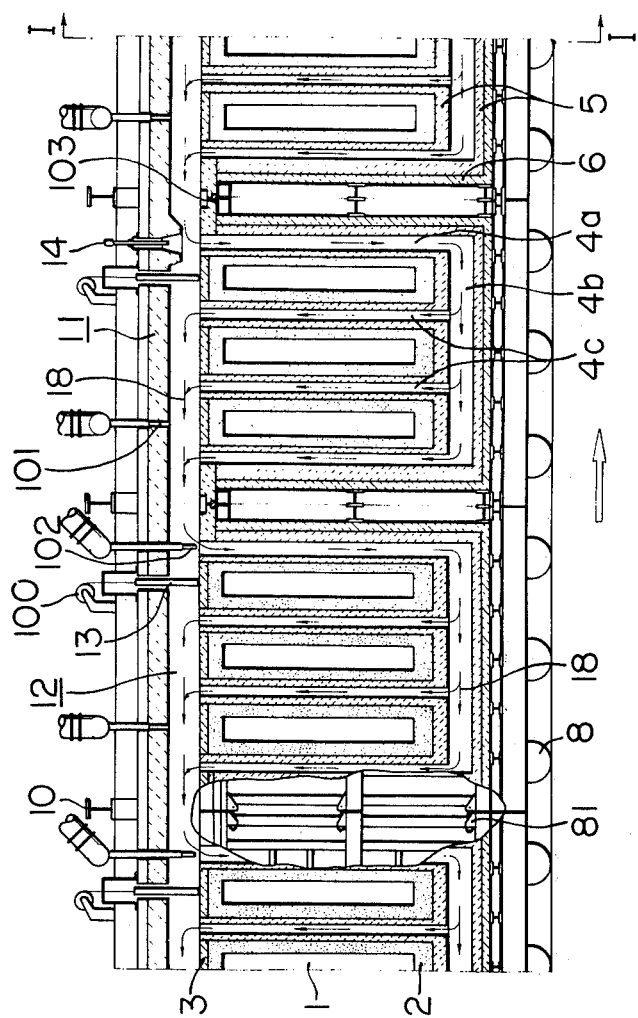
FIG. 3 is a vertical sectional view in the axial direction of the kiln, showing each relative portion and the gas flow between a fixed ceiling, a movable partition plate and a MOBAC.
Figure 4:
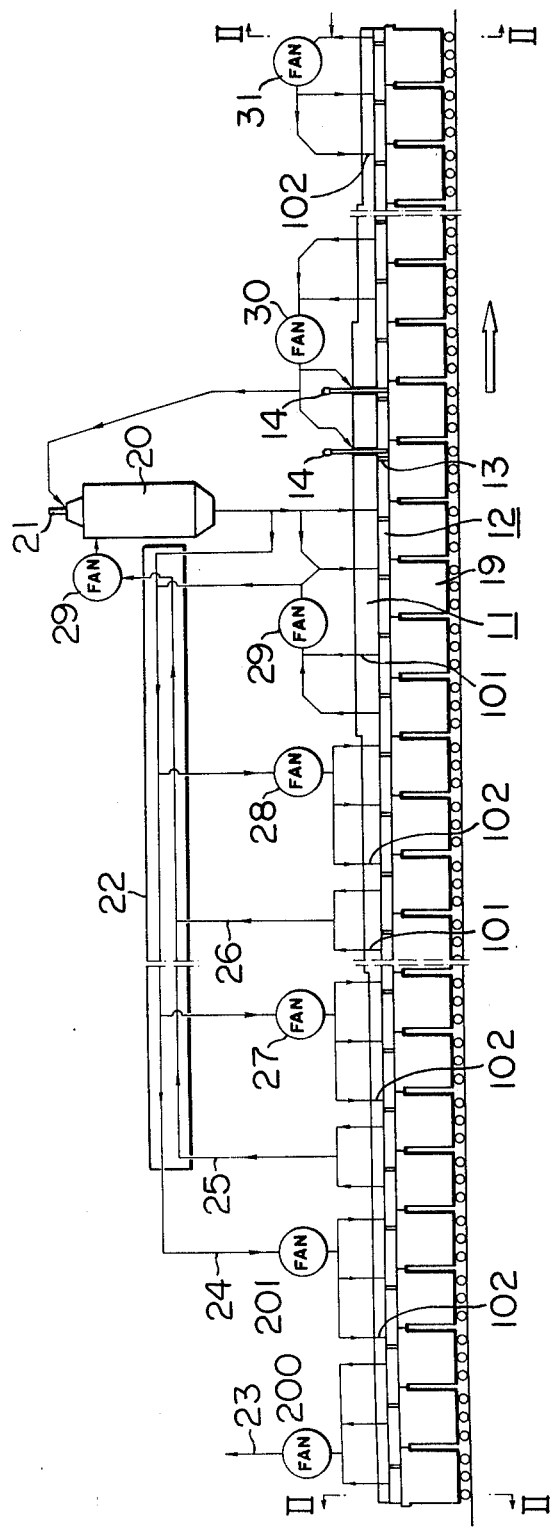
FIG. 4 shows the whole kiln configuration in one embodiment of the baking apparatus for carbonaceous molding according to the invention, and is a schematic view, foreshortened, side elevation of the kiln.

In the drawings reference numeral 1 shows a baking carbonaceous molding which is charged in a sagger 5, reference 2 a breeze charged as if surrounding the carbonaceous molding 1, reference 3 an anti-oxidation cover on the upper portion of saggers, reference 4a a downward flue for circulating preheating gas in the preheating zone, a downward combustion chamber in the burning zone and a downward cooling gas flue in the cooling zone, numeral 4b a preheating, burning or cooling horizontal gas glue positioned at the bottom portion of sagges (5), numeral 4c heating, burning or cooling upward gas flues, numeral 5 a refractory constituting side walls and partitions that make up the sagger, and gas flues are internally provided in said side walls and partitions, numeral 6 a heat-insulating material, numeral 7 a steel shell of MOBAC, numeral 8 a moving device, reference 81 a connecting mechanism, numeral 9 a stationary post, numeral 10 a fixed beam, numeral 11 a fixed ceiling supported by the stationary post 9 and the fixed beam 10, reference 12 an upper gas passage, reference 13 a movable partition plate, reference 100 a driving means of the movable partition plate 13, reference 14 a burner, numeral 101 a gas suction hole, numeral 102 an ejector nozzle, numeral 15 a heat-retaining wall arranged between posts 9, reference 16 a sealing device, reference 103 an upper contact surface of each MOBAC, reference 17 a heat-retaining space, and reference 18 a gas flow. Further, reference 19 is a MOBAC (Mobile Baking Chamber), reference 20 a burning furnace of the tar gas, reference 21 a burner of the burning furnace, numeral 22 a heat exchange zone consisting of a flue of the gas containing tar and a flue of high temperature gas after burning, numeral 23 an exhaust gas duct, numeral 200 a fan of the exhaust gas, numeral 24 a feeding duct of the clean gas after burning, numeral 201 a fan for guiding the clean gas into the furnace, references 25 and 26 extracting ducts of the tar-containing gas, references 27 and 28 feeding fans of the clean gas for temperature control, reference 29 a gas circulation fan, numeral 30 a fan for circulating as combustion air the high temperature air recovered from the cooling zone, and numeral 31 a cooling air feeding fan. The various means referred to above, except the MOBACs 19, are almost stationary, and they are controlled and operated according to a baking plan.

Referring to the drawings in greater detail, the MOBAC 19 is mainly constructed with a sagger 5, heating gas flues (4a, 4b and 4c) and shell 7, said sagger and heating gas flues are constructed with refractory material and said shell is constructed with steel. The thermal stress taking place or produced by the temperature difference between the contents consisting of the molding 1 to be baked, breeze 2 and refractory 5 and the steel shell 7 is born by expansion of the content during the preheating and burning and by shrinkage of the steel shell during the cooling, said thermal stress is supported with the steel shell, and each MOBAC 19 is connectable in a row by means of the connecting mechanism 81. In this case it is a requisite to decrease the construction weight of the MOBACs, and therefore, it is required to considerably to decrease the quantity of the refractory 5 and heat insulating material 6 used in said MOBAC 19 rather than in the furnace wall in the case of stationary construction. Since thin wall construction satisfying such conditions may naturally increase a heat loss there is provided further the heat-retaining space 17 at the outside of said MOBAC 19, i.e. between the MOBAC 19 and the fixed heat-retaining wall 15 mounted to the fixed post 9, thereby controlling the temperature of the heat-retaining space 17 so as to retain it below about 300° C where strength deterioration of the steel shell 7 of said MOBAC does not occur, so that the heat loss from the surface of the steel shell of said MOBAC 19 may be retained to a minimum.

Further, in said heat-retaining space 17 there are equally maintained the amount of thermal expansion of the contents and construction elements consisting of the baking molding 1, the breeze 2 and the refractory 5 consisting of the saggers and the gas flues in said MOBAC 19, and the amount of thermal expansion of the steel shell 7 of said MOBAC 19 through all the baking steps. This may lead in equilibrating both the expansion amount between said elements with minimum thermal stress so that this construction provides a method of retaining to a minimum damage to the internal construction and the steel shell of said MOBAC 19, which damages may be caused by thermal deformation.

Regarding the temperature in each zone of preheating, burning and cooling which are required in said heat-retaining space 17, the temperatures and amount of expansion of the contents and construction elements of said MOBAC 19 are calculated by curves of predetermined preheating, burning and cooling temperatures of the moldings 1 to be baked, and on this basis there may be determined by calculation the temperature in each zone necessary for corresponding expansion amount between the contents and the steel shell 7 of said MOBAC.

The temperature required in each zone for the steel shell 7 of the MOBAC is controlled by the circulation gas temperature of said heat-retaining space 17.

In the gas circulation for the control of each zone in the heat-retaining space 17, the radiated heat from the surface of the steel shell 7 of said MOBAC 19 in the baking zone is sucked from several places, a portion of the high temperature air recovered from the cooling zone is added for heat increase to circulation gas through the air circulation fan 30, the heated air is collected through a duct by means of a temperature controlling circulation fan (not shown) of the heat-retaining space 17, and the heated air is then guided into the lower temperature portion of the preheating zone by another duct, thereby retaining the necessary temperature for said steel shell 7 of the MOBAC 19 by regulating the quantity and temperatures of the circulation gases.

Said heat-retaining space 17 need naturally not be arranged at the very low temperature portion near the inlet or the outlet of the present apparatus.

The various gas flow 18 in the upper gas passage 12, which is countercurrent to the moving direction of the MOBAC 19, is intercepted by movable partition plate 13 mounted in the upper gas passage 12 above each MOBAC 19 and when the sagger side and bottom portions of the MOBAC 19 have been heated, the gases flow into the neighboring MOBAC through the upper gas passage 12, as shown by arrows.

Each movable partition plate 13 is provided in the upper gas passage 12 in such manner that it partitions the downward gas flues 4a from the neighboring upward gas flues 4c of the individual MOBAC 19, and it connects all upward gas flues 4c with the downward gas flues 4a of the neighboring MOBAC 19.

Between the upper portions of both the sides of a MOBAC 19 and the fixed ceiling 11 there is provided a suitable thermal expansion space, and it is intended to seal said space and the gas flue 12 from the open air by means of the side sealing devices 16. For example, sand seal and other sliding seal mechanisms may be adopted as the sealing device 16.

The upper contact surfaces 103 of interMOBACs 19 may be sealed by close adhesion of heat-resistant packing material charged onto each contact surface 103.

Although each MOBAC 19 is of the construction connectable in series, the connecting mechanism 81 is to be coupled at the beginning of baking and to be disengaged when the baking has finished.

The MOBAC 19 is moved forward by a pusher (not shown) so that usually there is no fear for the MOBACs 19 of being separated, but it is impossible to expect to restrain the thermal expansion deformation which takes place for the MOBACs in the advancing axial direction in the baking process, with only the reaction due to travel resistance among the MOBACs 19. The accumulating deformation amount in the advancing direction due to thermal expansion results in causing problems in the stationary mechanisms such as the movable partition plates 13, the burners 14 and the ejectors 102. Accordingly, the purpose of connecting each MOBAC 19 is not a mere connecting but has an important role of avoiding the expansion deformation of the MOBACs 19 in their advancing direction by means of mutual close adhesion.

In the system of the present invention wherein the MOBACs 19 move at predetermined time intervals, a fixed ceiling 11 is arranged over the entire upper length of the connected MOBACs, and said fixed ceiling 11 is provided with a gas recirculation means required for each of the preheating, baking and cooling zones of the invention and with a combustion means, there can be given some features which could not be achieved by conventional stationary batch-type furnace or ring kiln of stationary sagger system.

Firstly, baking and heating is usually effected in the downward combustion chamber 4a of MOBAC 19 which is in opposite direction to the burner 14 connected to said fixed ceiling 11. In addition it is capable of effecting the temperature control required for the whole baking proceedings and the baking of the coming-out tar gas, all by means of said gas recirculation means provided at the fixed ceiling 11.

The atmospheric gas in the kiln is approximately in the range 250°–600° C, which contains tar gas, and the entire quantity of said tar gas except a portion which burns in the kiln is guided up to the baking furnace 20 of the tar gas in said atmosphere gas recirculation system through a duct from a suction hole 101 through the fixed ceiling 11, but in the process the entire amount of said atmosphere gas is heat exchanged with a portion of the baking-finished clean gas through a heat exchange zone or chamber 22, so as to be subjected to a higher temperature, so that there is no problem of the tar being adhered to the duct, and after the gas has come to the burning furnace 20 of the tar gas, to be completely burned, it will again be utilized for the heat increase of the atmosphere gas in the kiln or the unburned gas.

Through the burning treatments the exhaust gas which is finally discharged outside the kiln may be emitted into the open air in a state where tar mists and tar fumes do not exist at all. Furthermore, the gas recirculation system mounted in said fixed ceiling 11 serves not only for controlling temperatures at each of preheating, baking and cooling zones but also for regulating the heating gas quantity and temperatures of the MOBACs 19 and giving a fluid energy to the passing gases by emitting a hot gas to the downward gas flue 4a of the MOBAC 19 through said ejector nozzle 102.

The pressure required for said ejector nozzle 102 may be obtained from the feeding fans 27, 28 of the clean gas for temperature control, the gas circulation fan 29, the fan 201 for guiding the clean gas into the furnace, the fan 30 for circulating the high temperature air recovered from the cooling zone, and the cooling air feeding fan 31 which are provided in the gas recirculation system. In addition the material of said ejector nozzle 102 may be selected from among metals or ceramics.

The required number of the connecting MOBACs 19 is determind for each occasion according to baking ability, baking period of time, etc., and the connecteed number becomes the whole length of the present apparatus. The forward movement of the MOBACs 19 is intermittently made at a short period of time, by the distance of one chamber, by a pusher on the basis of all, desirable baking time schedule. Prior to this movement, the movable partition plate 13 is first raised in such a way that the advance of the MOBACs 19 may not be hindered, then the fuel supply of the ceiling burner 14 is stopped, the movement of the MOBACs 19 begins successively, and the movable partition plate 13 is lowered to its normal position concurrently with the stopping movement of the MOBACs, thereby commencing the burning of said burner 14.

All the operations referred to above are successively carried out.

Moreover, in the exhausting, circulating, burning and cooling systems, the gas quantity is controlled by regulating the number of revolutions of the fans and the damper arranged at ducts of the circulating system, in the course of moving the MOBACs 19, and partial extra clean gas is discharged outside the kiln, during which period various fans will not stop. The baked and cooled MOBACs 19 are turned to a circuit line by a traverser (not shown), enter an exclusive power handling chamber arranged on said line, where the anti-oxidation cover 3 is removed, the products are discharged and molding 1 to be baked and breeze 2 are again charged in the units, and then the MOBACs are forwarded to the inlet side of the present apparatus, so as to repeat said baking operations.

If a continuous baking of large quantity, in which the moldings themselves to be baked can be baked in movement as in the present invention, could be materialized in the primary baking method of large-sized carbonaceous moldings, it may solve the problems at a stroke such as energy saving, pollution, man-power saving, operational environment and the quality of the product, which problems being possessed by the ring kiln so far employed as a mass baking system. That is, with regard to the energy saving and the pollution prevention, it is possible to completely catch the tar gas generating from the carbonaceous molding in the preheating temperature rising zone in the baking process and to completely burn it, utilizing all the combustion heat as a preheating source for energy saving, and preventing pollution caused by the discharge of tar mists or tar fumes mixed in the exhaust gas. An exhaust gas treating device is also no longer required.

Further even with respect to the improvement of danger avoidance of the so-called "Intermediate Combustion" in which ignition is made to the combustibles which may be discharged into the atmosphere gas from the baking molding in the preheating zone, ring kiln requires an excess air coefficient $A/Ao = M = 10 - 15$ wherein Ao is a theoretical air amount and A is an air amount used in practice so that $O_2$ concentration becomes very high and the ring kiln has a great danger of causing "Intermediate Combustion." On the contrary, in the present invention $M = 1.5 - 2.0$ and the $O_2$ concentration in each zone is controlled so as to avoid the "Intermediate Combustion" in the preheating zone between 300° and 600° C. Moreover, according to the invention clean gas for temperature rise can be utilized so that initial heat-up rate in the preheating zone is raisable and the baking cycle can be shortened.

Furthermore, the amount of total exhaust gas is greater decreased by reducing the excess air coefficient M so that the thermal efficiency is enhanced. As regards the improvement of working environment and the man-power saving, in the Ring Kiln Type they are hindered because the charge/discharge operation position and the baking position usually move.

The present invention relates to a complete continuous baking method in which the heating positions are fixed and the moldings to be baked move, and therefore, the preheating, burning and cooling zones are always fixed, the charge/discharge operation is automated at a determined place, and power handling and dust preventing equipments may also be fixed so that the working environment may be quite improved.

In the Ring Kiln Type the charging of baking molding into saggers takes a double pile charging while in this invention baking is possible with a single pile charging so that not only the charge/discharge operation will be greatly simplified but also human accidents during operation will be prevented.

In the ring kiln the gas flow is a downward gas flow whereas in this invention it is a upward flow, thus making the product properties more uniform.

The above is the detailed explanation of the construction of this invention. By comparison various operation conditions between the invention and the ring kiln will be further illustrated by the following, nonlimitative, example.

EXAMPLE

The following is a table showing the comparative results, between the Ring Kiln System and the present system, of primary baking kiln having the capacity of 670 T/month of large-sized round electrode such as of 18-24 inch diameter.

TABLE

| Type Item | Ring Kiln Type | The present invention |
|---|---|---|
| I. Baking Cycle | 608 Hrs in total Reasons: | 436 Hrs in total |
| | a. Necessary time for charging and discharging has to be added to the actual baking cycle due to its design principle. (38 Hrs.) | a. Charging and discharging work can be made independently separated from the baking cycle. (0 Hrs.) |
| | b. Preheating time is extremely long because the individual temperature control of the preheating zone is impossible.(344 Hrs.) | b. Preheating time is short due to the availability of the adjustment of the individual control (290 Hrs.) |
| | c. Baking time (56 Hrs.) | c. Baking time (66 Hrs.) |
| | d. It is necessary to complete the cooling within the kiln.(170 Hrs.) | d. Cooling under a certain temperature can be made outside the kiln.(80 Hrs.) |
| II. Baking Temperature and Baking Effects | Baking Atmosphere 1,050° C | 930° C |
| | Product Temperature 800° C Δ T 100° C Reasons: a. Due to the double pile charge, | 800° C Δ T 50° C a. Single pile charge makes |

TABLE-continued

| Item | Type | Ring Kiln Type | The present invention |
|---|---|---|---|
| | | temperature difference in the product = Δ T has to become larger | Δ T smaller. |
| | | b. Downward firing trends to heat the product earlier from the top, thus resulting in the insufficient physical properties of the product. | b. Due to the upward firing, the product gets the better physical properties because its bottom is heated earlier. |
| | | c. Zone control of the preheating is very difficult because there is no possibility for intermediate adjustment of heating gas flow. | c. Heating gas is in recirculation and be reheated by additional heat. Therefore, result of the zone control of preheating temperature and preheating become very effective. |
| III. Fuel consumption | | 115 L/t (Oil) | 97 L/t (Oil) |
| | | Reasons: | |
| | | a. 50% of total tar-gas volume produced from the charged material is emitted with exhaust gas out of the kiln without being utilized. | a. All tar-gas produced is effectively burned out in the kiln system and gives its combustion heat to the recirculated gas. |
| | | b. Owing to its large excess air ratio M-15, the exhaust gas volume, consequently, the heat loss becomes too large. | b. Excess air ratio remains M-1.8, i.e. small exhaust gas and minimum heat loss. |
| | | c. Due to its stationary construction, the total mass to be heated is very large. | c. The total mass to be heated remains comparatively small because of continuous moving construction. |
| IV. Operational Easiness | | a. Danger of Intermediate Combustion" in the kiln, because of rich content of oxygen in the atmosphere. | a. No danger of "Intermediate Combustion" in the kiln, because of small oxygen content in the kiln gas which is enabled by small M-value and gas recirculation. |
| | | b. Burning equipment to be removed at each process progress. | b. Burning equipment remain at a fixed position. |
| | | c. Double pile charging makes sagger pit deeper and chage/discharge work more difficult. | c. Single pile charging makes charge/discharge work easier. No charge/discharge work in sagger pit by worker. |
| | | d. Kiln charge/discharge operation: Operation must be done from the top of the kiln moving from one place to another because the saggers are fixed. | d. Kiln charge/discharge are made on a determined separated place outside the kiln by using the special equipment for that purpose. |
| | | e. Environmental conditions for workers; bad, particularly at the time of breeze charge. | e. Environmental conditions for workers; good, an independent and separated working place from the kiln is used for charge and discharge work. |
| | | f. Mechanization and Automatization are limited only to the over-head travelling crane. | f. Mechanization and Automatization: No over-head travelling crane is needed. A separated working room for charging and discharging work is provided as one of the total material handling system which can be automated. |
| | | g. Equipment for exhaust gas treatment; necessary | g. Equipment for exhaust gas treatment; not necessary |
| V. Initial Investment | | 10/10 Kiln proper, Foundation, Building, Crane, Combustion equipment, Breeze handling equipment and exhaust gas treatment. | 9/10 Kiln proper, Foundation, Building, Charging & Discharging equipment, Combusting equipment, Breeze handling equipment, and diesel generator. |
| VI. Operating Cost | | Labor cost 10/10 Fuel cost 10/10 Electricity cost 10/10 | Labor cost 8/10 Fuel cost 8.4/10 Electricity cost 10/10 |

What we claim is:

1. A method for the continuous baking of preheating, burning and cooling of carbonaceous moldings, which comprises charging, with carbonaceous moldings to be baked and breeze, a mobile baking chamber provided with a combustion chamber and a gas flue through which combustion gas, heating gas or cooling air passes, sealing from the atmospheric air the space between a fixed ceiling having a combustion means and a gas recirculation means and said mobile baking chamber, and the upper contact surface of intermobile baking chamber, and connecting a number of said mobile baking chamber in a row for movement beneath the fixed ceiling.

2. A method as set forth in claim 1 including passing through said ceiling and emitting into a downward gas flue of the mobile baking chamber the gases which are used as circulation energy of atmosphere gas in the kiln, thus decreasing the furnace pressure difference required for the gas flow in the kiln, and regulating the temperature and quantity of said atmosphere gas.

3. A method as set forth in claim 1 including partitioning the gas in the kiln at each mobile baking chamber by a movable partition plate and passing the gas past the side portion and bottom portion of saggers in the mobile baking chambers.

4. A method as set forth in claim 1 in which the outer periphery of the mobile baking chamber is heat retaining, and maintaining to a minimum the thermal stress which takes place owing to the thermal expansion difference between the steel shell and the refractory material in said mobile baking chamber.

5. A method as set forth in claim 1 including burning the gases containing tar mists and fumes generated in the temperature zone 250°-600° C, and feeding the temperature-increased clean gas as a heating atmosphere gas of the preheating zone in the range from room temperature to a temperature less than 250° C.

6. A method as set forth in claim 1 including burning the combustibles in the atmosphere gases in said kiln in the temperature zone where volatile ingredients come out for temperature rising by a gas recirculation means, and maintaining the $O_2$ concentration in the atmosphere gas in said kiln less than 14 percent.

7. A method as set forth in claim 1 including intermittently firing the combustion means in the molding baking zone higher than 600° C.

8. An apparatus for the continuous baking of carbonaceous moldings comprising a mobile baking chamber, a fixed ceiling and outside heat-retaining side walls, said mobile baking chamber having side surfaces and sealing material at the upper portions of front and rear surfaces of said mobile baking chamber, a number of said mobile baking chamber being connected together in series, said fixed ceiling having side surfaces and extending over the whole length of the upper portions of said connected mobile baking chambers, a slidable seal mechanism connected between and sealing the upper portions of the side surfaces of said mobile baking chambers and the side surface of said fixed ceiling so as to form an upper gas flue between the upper surfaces of said mobile baking chambers and said ceiling, said side surfaces of said mobile baking chamber including outside heat-retaining walls spaced from said outside heat-retaining side walls, said outside heat-retaining side walls having upper portions connected with said fixed ceiling, and a second slidable seal mechanism connected between and sealing the lower portions of said outside heat-retaining side walls and said outside heat-retaining walls of said mobile baking chambers thereby forming a heat-retaining space therebetween.

9. An apparatus as set forth in claim 8 in which said mobile baking chambers having saggers charged with a carbonaceous molding to be baked and with breeze also include a moving mechanism, each sagger having a side surface and bottom portion constructed with refractory side walls internally providing a gas flue and with a refractory bed respectively, and the outer peripheries of said refractory side walls and the bed being constructed with a steel shell.

10. An apparatus as set forth in claim 9 in which a number of said saggers are included in each of said mobile baking chambers and each sagger having an anti-oxidation cover of refractory material sealing the top thereof.

11. An apparatus as set forth in claim 8 in which said mobile baking chamber in the kiln is provided with a connecting mechanism which restrains thermal expansion deformation occuring in the advancing direction of said chamber.

12. An apparatus as set forth in claim 8, including a movable partition plate connected in the upper gas flue between the lower surface of said fixed ceiling and the upper surface of said mobile baking chamber, and constructed either of metal or a refractory material.

13. An apparatus as set forth in claim 8 including a plurality of burners arranged on the fixed ceiling at selected distances along a lenght thereof and defining a baking zone, each mobile baking chamber having at least one top opening downward combustion chamber having an axis at right angles to said fixed ceiling, each burner connected in alignment with the axis of the downward combustion chamber of a plurality of said mobile baking chambers, at each selected distance a plurality of said burners are provided laterally of the width of said fixed ceiling, and each burner provided with an intermittent burning mechanism.

14. An apparatus as set forth in claim 13 including gas circulation means mounted at the upper portion of said fixed ceiling and in a preheating zone consists of a duct connected to a baking furnace, a heat exchange device through which said duct extends, a circulation fan and a gas flow control mechanism connected in said duct, said duct being connected with a plurality of gas suction holes in said fixed ceiling on the input side of said furnace and with gas ejector nozzles through the fixed ceiling on the output side of said furnace.

15. An apparatus as set forth in claim 14 in which said ejector nozzles are connected with said circulation fan and said duct and arranged in the axial direction of said downward combustion chamber in the mobile baking chamber.

* * * * *